US012762044B2

(12) United States Patent
Mynampati et al.

(10) Patent No.: US 12,762,044 B2
(45) Date of Patent: Oct. 13, 2026

(54) SYSTEM AND METHOD FOR GENERATING TEST DATA FOR A CODE TESTING SYSTEM

(71) Applicant: Bank of America Corporation, Charlotte, NC (US)

(72) Inventors: Jayadev Mynampati, Hyderabad (IN); Akella Venkata Subrahmanya Swamy, Hyderabad (IN); Alkesha Ravindra Baikar, Alibag (IN); Peruri Lavanya, Hyderabad (IN); Karthik Kumar Venkatasubramanian, Chennai (IN); Jayakumar Chakka, Secunderabad (IN); Sreenivasulu R Bayyareddy, Frisco, TX (US); Maneesh Kumar Sethia, Hyderabad (IN); Abhijit Behera, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 258 days.

(21) Appl. No.: 18/771,414

(22) Filed: Jul. 12, 2024

(65) Prior Publication Data

US 2026/0017179 A1 Jan. 15, 2026

(51) Int. Cl.

| | |
|---|---|
| ***G06F 11/3668*** | (2025.01) |
| ***G06F 16/245*** | (2019.01) |
| ***G06N 20/00*** | (2019.01) |

(52) U.S. Cl.

CPC ...... *G06F 11/3688* (2013.01); *G06F 11/3684* (2013.01); *G06F 16/245* (2019.01); *G06N 20/00* (2019.01)

(58) Field of Classification Search

CPC ........................................ G06F 11/3668–3698

See application file for complete search history.

(56) References Cited

U.S. PATENT DOCUMENTS

| | | | |
|---|---|---|---|
| 9,003,222 | B2 | 4/2015 | Bhamidipaty et al. |
| 9,015,668 | B1 | 4/2015 | Michelsen |

(Continued)

OTHER PUBLICATIONS

Buda, Teodora Sandra, Generation of Test Databases using Sampling Methods, ISSTA 2013: Proceedings of the 2013 International Symposium on Software Testing and Analysis, Jul. 2013, 4 pages, [retrieved on May 20, 2026], Retrieved from the Internet: <URL:http://dl.acm.org/>.*

(Continued)

*Primary Examiner* — Geoffrey R St Leger

(57) ABSTRACT

A data manager obtains table metadata associated with a production database table stored in a production database of the production system. In addition, the data manager extracts a portion of the production data from the production database table by running a query in the production database, wherein the extracted portion of the production data is to be used as sample data when part of generating the test data. The data manager determines data properties of the production data stored in the production database table based on the sample data extracted from the production database table. The data manager then generates a requested number of data records of the test data based on the table metadata and the data properties associated with the production database table, wherein the generated test data at least partially mimics the production data from the production database table.

20 Claims, 3 Drawing Sheets

(56) References Cited

U.S. PATENT DOCUMENTS

| | | | |
|---|---|---|---|
| 9,866,466 B2 | 1/2018 | Gopshtein et al. | |
| 10,320,828 B1 | 6/2019 | Derbeko et al. | |
| 10,339,038 B1 * | 7/2019 | Singh | G06F 11/3684 |
| 10,339,039 B2 | 7/2019 | Raheja et al. | |
| 10,592,399 B2 | 3/2020 | Ben-Bassat et al. | |
| 10,740,208 B2 | 8/2020 | Bryant et al. | |
| 10,963,786 B1 | 3/2021 | Taylor et al. | |
| 10,997,063 B1 | 5/2021 | Rai et al. | |
| 11,106,562 B2 | 8/2021 | Su et al. | |
| 11,151,025 B1 | 10/2021 | Gupta | |
| 11,210,203 B2 | 12/2021 | Jin et al. | |
| 11,366,738 B2 | 6/2022 | Perea et al. | |
| 2014/0317600 A1 | 10/2014 | Klunder et al. | |
| 2015/0193226 A1 | 7/2015 | Michelsen | |
| 2018/0210817 A1 * | 7/2018 | Kelly | G06F 16/27 |
| 2019/0340101 A1 | 11/2019 | Kupitman et al. | |
| 2019/0394113 A1 | 12/2019 | Huang | |
| 2021/0157712 A1 | 5/2021 | Kalbac | |
| 2021/0374120 A1 * | 12/2021 | Turaga | G06F 16/2365 |
| 2022/0012167 A1 | 1/2022 | Verma et al. | |
| 2022/0188700 A1 | 6/2022 | Khavronin et al. | |

OTHER PUBLICATIONS

Kasturi, Santanam, Some Aspects of Test Data Management Strategy, 2020 IEEE International Conference on Computing, Power and Communication Technologies (GUCON), Oct. 2020, 7 pages, [retrieved on May 20, 2026], Retrieved from the Internet: <URL:http://ieeexplore.ieee.org/>.*

Behjati, Razieh, et al., Synthetic Test Data Generation Using Recurrent Neural Networks: A Position Paper, Proc of the 7th International Workshop on Realizing Artificial Intelligence Synergies in Software Engineering, May 2019, 6 pages, [retrieved on May 20, 2026], Retrieved from the Internet: <URL:http://dl.acm.org/>.*

Jayadev Mynampati, A system and method for generating testing data for a code testing system using synthetic data generation, U.S. Appl. No. 18/771,462, filed Jul. 12, 2024.

* cited by examiner

SYSTEM AND METHOD FOR GENERATING TEST DATA FOR A CODE TESTING SYSTEM

TECHNICAL FELD

The present disclosure relates generally to network communication, and more specifically to a system and method for generating test data for a code testing system.

BACKGROUND

A test system generally is an image (e.g., copy) of a production system or a portion thereof. This allows a test engineer to test software updates within the test system under conditions similar to the production system. Typically, generating the test system or a portion thereof includes copying at least a portion of the production database to the test database, including copying production data from one or more production database tables to the test database. As part of data privacy regulations, when copying production data to the test database, present systems typically de-identify sensitive data fields by applying privacy enhancement techniques. Several limitations exist in present systems in relation to copying production data to a test system. For example, there is a high risk of re-identification of de-identified data based on attributes or through inference. The de-identification process adds delays to making test data available in the test system. Further, present systems do not allow performance testing of the production system that may need large volumes of test data larger than the production data stored in the production database.

SUMMARY

The system and method implemented by the system as disclosed in the present disclosure provide technical solutions to the technical problems discussed above by synthetically generating test data for test systems.

For example, the disclosed system and methods provide the practical application of synthetically generating test data for a test system using sample data from a production system, such that the generated test data at least partially mimics data characteristics of production data associated with the production system while protecting sensitive data fields from the production data. As described in embodiments of the present disclosure, a data manager obtains table metadata associated with a production database table stored in a production database of the production system, wherein the table metadata at least comprises a format of the production database table. In addition, the data manager extracts a portion of the production data from the production database table by running a query in the production database, wherein the extracted portion of the production data is to be used as sample data when part of generating the test data. The data manager determines data properties of the production data stored in the production database table based on the sample data extracted from the production database table. The data manager then generates a requested number of data records of the test data based on the table metadata and the data properties associated with the production database table, wherein the generated test data at least partially mimics the production data from the production database table.

The disclosed system and method provide an additional practical application of synthetically generating test data for a test system using a set of rules defining data properties of the test data, such that the generated test data at least partially mimics data characteristics of production data associated with the production system while protecting sensitive data fields from the production data. As described in embodiments of the present disclosure, the data manager obtains a set of rules at least defining data properties for one or more data attributes associated with a test database table that is to mimic a production database table stored in the production system, wherein the test database table is stored in the test database associated with the test system. In addition, the data manager obtains table metadata associated with the production database table stored in a production database of the production system, wherein the table metadata at least comprises a format of the production database table. The data manager then generates a request number of data records based at least on the set of rules and the table metadata associated with the production database table, wherein the generated test data at least partially mimics the production data from the production database table.

By synthetically generating the test data, the disclosed system and methods avoid inclusion of sensitive data in the generated test data, and thus avoids disclosure of sensitive data to unauthorized users. This improves data security in the production system and improves overall data security in the computing network. Further, by synthetically generating the test data that mimics production data, the disclosed system and method save processing resources that would otherwise be used to run de-identification algorithms on the production data to generate the test data for the test system. The saving of processing resources leads to improved processing performance of computing systems that implement the production system as well as the test system.

Thus, the disclosed system and method generally improves the technology associated with testing production systems.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
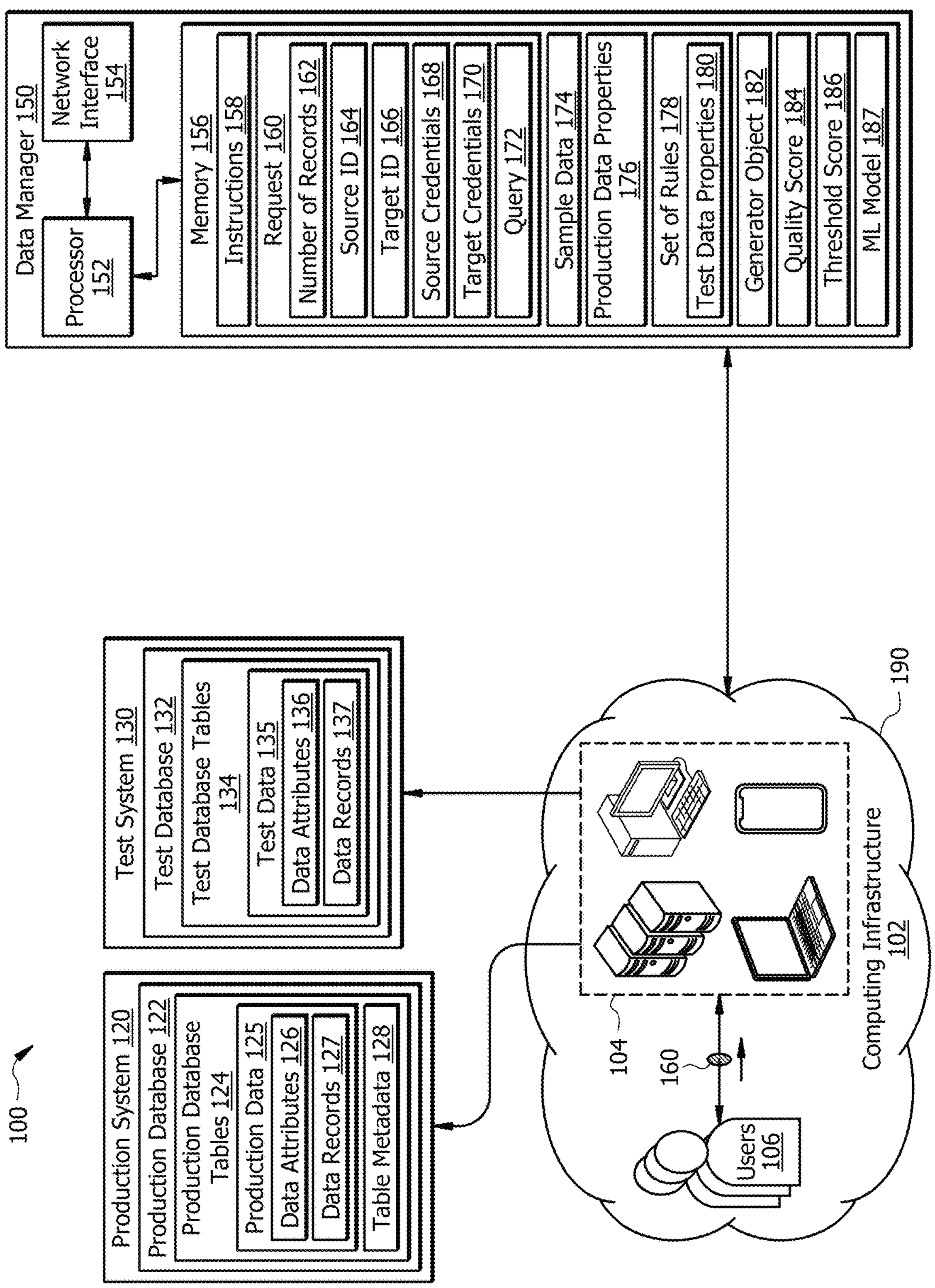
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 connected to a network 190. Computing infrastructure 102 may include a plurality of hardware and software components. The hardware components may include, but are not limited to, computing nodes 104 such as desktop computers, smartphones, tablet computers, laptop computers, servers and data centers, mainframe computers, virtual reality (VR) headsets, augmented reality (AR) glasses and other hardware devices such as printers, routers, hubs, switches, and memory all connected to the network 190. Software components may include software applications that are run by one or more of the computing nodes 104 including, but not limited to, operating systems, user interface applications, third party software, database management software, service management software, mainframe software, metaverse software, AI tools and other customized software programs (e.g., data manager 150) implementing particular functionalities. For example, software code relating to one or more software applications may be stored in a memory device and one or more processors (e.g., belonging to one or more computing nodes 104) may execute the software code to implement respective functionalities. An example software application run by one or more computing nodes 104 of the computing infrastructure 102 may include the data manager 150. In one embodiment, at least a portion of the computing infrastructure 102 may be representative of an Information Technology (IT) infrastructure of an organization.

One or more of the computing nodes 104 may be operated by a user 106. For example, a computing node 104 may provide a user interface using which a user 106 may operate the computing node 104 to perform data interactions within the computing infrastructure 102.

One or more computing nodes 104 of the computing infrastructure 102 may be representative of a computing system which hosts software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., data manager 150) as described below. In certain embodiments, one or more of the computing nodes 104 may run a thin client software application where the processing is directed by the thin client but largely performed by a central entity such as a server (not shown).

Network 190, in general, may be a wide area network (WAN), a personal area network (PAN), a cellular network, or any other technology that allows devices to communicate electronically with other devices. In one or more embodiments, network 189 may be the Internet.

At least a portion of the computing infrastructure 102 (e.g., one or more computing nodes 104) may form a production system 120. Similarly, a portion of the computing infrastructure 102 (e.g., one or more computing nodes 104) may form a test system 130. It may be noted that the portions of the computing infrastructure 102 that form the production system 120 and the test system 130 may at least partially overlap. For example, one or more computing nodes 104 that are part of the production system 120 may also be part of the test system 130.

Each of the production system 120 and the test system 130 may represent a computing environment of an organization. For example, the production system 120 may represent a production computing environment where the latest versions of software, products or updates are pushed live to the intended users. A production computing environment generally can be thought of as a real-time computing system where computer programs are run, and hardware setups are installed and relied on for an organization's daily operations. In one embodiment, the test environment may represent a test computing environment, which is a lower-level environment. A test computing environment generally refers to a workspace where a series of tests can be conducted on a software application before deployment in a production computing environment. In some cases, software developers may create and test software patches or updates for one or more software applications in an image of the production environment (e.g., production system 120) stored in the test computing environment (e.g., test system 130) so that there is no service interruption in the production computing environment (e.g., production system 120). Once ready, the software patch or update may be applied to the respective software application in the live production computing environment (e.g., production system 120).

As shown in FIG. 1, production system 120 includes a production database 122 that stores one or more production database tables 124. Each production database table 124 includes production data 125. For example, production data 125 included in a production database table 124 may include a plurality of data records 127 associated with a plurality of data attributes 126. Each data attribute 126 corresponds to a column of the production database table 124 and each data record 127 corresponds to a row of the production database table 124. Each data record 127 (e.g., each row) of the production database table 124 provides a data value for each data attribute 126 (e.g., each column) of the production database table 124.

The production database 122 may further store table metadata 128 associated with each production database table 124. The table metadata 128 associated with a particular production database table 124 generally includes information about the production data 125 stored in the production database table 124, such as origin, format, quality, and usage of the production data 125. For example, table metadata 128 associated with a production database table 124 may include structured information that provides additional details about production data 125 such as data attributes 126 (e.g., columns) included in the production database table 124, data types, field names, and relationships. In some cases, table metadata 128 associated with a plurality of production database tables 124 associated with the production system 120 is stored as part of a metadata catalog (not shown) that serves as a comprehensive database that describes the characteristics, structure and context of the production data associated with the production system 120.

Similarly, the test system 130 may include a test database 132 that may store one or more test database tables 134. Each test database table 134 includes test data 135 that mimics the production data 135 or a portion thereof stored in a corresponding production database table 124. Test data 135 included in a test database table 134 may include a plurality of data records 137 associated with a plurality of data attributes 136. Each data attribute 136 corresponds to a column of the test database table 134 and each data record 137 corresponds to a row of the test database table 134. Each data attribute 136 (e.g., each column) indicates a data type of the test data 135 associated with the data attribute (e.g., data type of data included in the column). Each data record 137 (e.g., each row) of the test database table 134 provides a data value for each data attribute 136 (e.g., each column) of the test database table 134. In one embodiment, each test database table 134 corresponds to a production database table 124. Further, in one embodiment, the data attributes 136 included in a test database table 134 are same as the data attributes 126 of the corresponding production database table 134. However, as discussed below, the data records 137 included in a test database table 134 may not be identical to the data records 127 of the corresponding production database table 124.

In present systems, the test system 130 generally is an image (e.g., copy) of the production system 120 or a portion thereof. This allows a test engineer to test software updates within the test system 130 under conditions similar to the production system 120. Typically, generating the test system 130 or a portion thereof includes copying at least a portion of the production database 122 to the test database 132 including copying production data 125 from one or more production database tables to the test database 132. As part of data privacy regulations, when copying production data 125 to the test database 132, present systems typically de-identify sensitive data fields by applying privacy enhancement techniques. For example, several data obfuscation methodologies are used to anonymize sensitive data fields in the production data 125 before making the data fields available in the test system 130. Several limitations exist in present systems in relation to copying production data 125 to a test system 130. For example, there is a high risk of re-identification of de-identified data based on attributes or through inference. The de-identification process adds delays to making test data 135 available in the test system 130. Further, present systems do not allow performance testing of the production system 120 that may need large volumes of test data 135 larger than the production data 125 stored in the production database 122. Additionally, the quality of test data 135 made available by present systems is not of high quality since the test data 135 may not always closely mimic the production data 125.

Embodiments of the present disclosure discuss techniques for synthetically/programmatically generating necessary volumes of high-quality test data 135 for the test system 130 such that the generated test data 135 mimics data characteristics of the production data 125 while protecting sensitive data fields from the production data 125.

It may be noted that while embodiments of the present disclosure are discussed with reference to generating test data 135 for a test system 130, wherein the test data 135 mimics at least a portion of the production data 125 stored at the production system 120, a person having ordinary skill in the art may appreciate that these embodiments apply to generating data for any lower-level system or environment, wherein the generated data is based on at least a portion of the production data 125 associated with the production system 120.

Further, it may be noted that, in the context of the present disclosure, test data 135 mimicking production data 125 does not mean that the test data 135 is an exact copy of the production data 125 it mimics. Instead, test data 135 preserves the table characteristics and data characteristics of the production data 125 it mimics but includes data values that are different from the data values included in the production data 125.

At least a portion of the computing infrastructure 102 (e.g., one or more computing nodes 104) may implement a data manager 150 which may be configured to implement techniques for generating test data 135 for a test system 130 that corresponds to a production system 120. The data manager 150 comprises a processor 152, a memory 156, and a network interface 154. The data manager 150 may be configured as shown in FIG. 1 or in any other suitable configuration.

The processor 152 comprises one or more processors operably coupled to the memory 156. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions 158 to implement the data manager 150. In this way, processor 152 may be a special-purpose computer designed to implement the functions disclosed herein. In one or more embodiments, the data manager 150 is implemented using logic units, FPGAs, ASICs, DSPs, or any other suitable hardware. The data manager 150 is configured to operate as described with reference to FIGS. 2 and 3. For example, the processor 152 may be configured to perform at least a portion of the methods 200 and 300 as described in FIGS. 2 and 3 respectively.

The memory 156 comprises a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may comprise a read-only memory (ROM), random-access memory (RAM), ternary content-addressable memory (TCAM), dynamic random-access memory (DRAM), and static random-access memory (SRAM).

The memory 156 is operable to store instructions 158, requests 160 for generating test data 135, sample data 174 extracted from the production database 122, production data properties 176, set of rules 178 including test data properties 180, generator objects 182, quality scores 184, threshold score 186, Machine Learning (ML) model 187, and any other data needed to performed operations of the data manager 150 as described in embodiments of the present disclosure. The instructions 158 may include any suitable set of instructions, logic, rules, or code operable to execute the data manager 150.

The network interface 154 is configured to enable wired and/or wireless communications. The network interface 154 is configured to communicate data between the data manager 150 and other devices, systems, or domains (e.g., computing nodes 104, production system 120, test system etc.). For example, the network interface 154 may comprise a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that each of the computing nodes 104 including the computing nodes that implement the production system 120 and the test system may be implemented like the data manager 150 shown in FIG. 1. For example, each of the computing nodes 104 may have a respective processor and a memory that stores data and instructions to perform a respective functionality of the computing node 104.

The data manager 150 may be configured to generate test data 135 for the test system 130, wherein the test data 135 at least partially mimics the production data 125 in the production system 120. The process of generating test data 135 may begin with the data manager 150 receiving a request 160 for generating test data 135 for the test system 130 that at least partially mimics production data 125 associated with the production system. The request 160 may be initiated by a user 106 (e.g., using a computing node 104). Additionally, or alternatively, the request 160 may be generated by one or more computing nodes 104 without intervention from a user 106. As shown in FIG. 1, the request 160 may include one or more of a number 162 of records (e.g., data records 137 of test data 135), source ID 164, target ID 166, source credentials 168, target credentials 170, or a query 172.

The number 162 of records indicates a number of data records 137 of the test data 135 that are to be generated for the test system 130. The source ID 164 may include one or more of an identity of the production system 120, or the identities of one or more production database tables 124 based on which the requested test data 135 is to be generated. For example, source ID 164 may include a device ID and/or network address of one or more computing nodes 104 that store a particular production database table 124 based on which the test data 135 is to be generated and an identity (e.g., unique file name/table ID) of the particular production database table 124. In one embodiment, when source ID 164 includes an identity of a particular production database table 124, it means that the generated test data 135 is to at least partially mimic the production data 125 from the particular production database table 124. The target ID 166 may include one or more of an identity of the test system 130, or the identities of one or more test database tables 134 in which the respective test data 135 is to be inserted. For example, the target ID 166 may include a device ID and/or network address of one or more computing nodes 104 that store a particular test database table 134 that is to store generated test data 135 that at least partially mimics production data 125 from the corresponding production database table 124 identified by the source ID 164. Source credentials 168 may include authorization and/or login credentials needed to access the production system 120 and extract table metadata and/or production data 125 (if needed). The target credentials 170 may include authorization and/or login credentials needed to access the test system 130 and load test data 135 into a test database table 134.

Synthetic Test Data Generation Using Sample Production Data

In certain embodiments, the data manager 150 may be configured to generate test data 135 for the test system 130 based at least in part upon sample data 174 extracted from the production system 120. In one example, the request 160 to generate the test data 135 may include a number 162 of records of the test data 135 that are to be generated, a source ID 164 including an identity of the production system 120 and the identity of a particular production database table 124, a target ID 166 including an identity of the test system 130 and an identity of the test database table 134 in which the test data 135 is to be loaded, source credentials 168 associated with the production system 120, target credentials 170 associated with the target system 130, and a query 172 configured to extract a portion of the production data 125 from the particular production database table 124. As described further below, the portion of the production data 125 extracted from the production database table 124 is used as sample data 174 for generating the requested test data 135. The inclusion of the source ID associated with the production database table 124 indicates that the requested test data 135 is to at least partially mimic the production data 135 from the production database table 124. In one embodiment, the test database table 134 identified in the request 160 is configured to mimic the production database table 124 identified in the request 160. In other words, the data attributes 136 included in the test database table 134 are same or similar to the data attributes 126 included in the production database table 124.

Upon receiving the request 160, the data manager 150 may be configured to obtain the table metadata 128 associated with the production database table 124 identified in the request 160. As described above, the table metadata 128 includes information about the production data 125 stored in the production database table 124, such as origin, format, quality, and usage of the production data 125. For example, table metadata 128 associated with a production database table 124 may include structured information that provides additional details about production data 125 such as data attributes 126 (e.g., columns) included in the production database table 124, data types, field names, and relationships. In one embodiment, the data manager 150 may be configured to extract table metadata 128 of the production database table 124 from the metadata catalog (not shown) associated with the production database 122.

Additionally, or alternatively, the data manager 150 runs the query 172 in the production database 122 to extract a portion of the production data 125 from the production database table 124 identified in the request 160. As described above, the query 172 is configured to extract the portion of the production data 125 from the particular production database table 124. As described further below, the portion of the production data 125 extracted from the production database table 124 is to be used as sample data 174 for generating the requested test data 135. For example, a user 106 who initiated the request 160 may configure the query 172 as a means to provide sample data 174, wherein the generated test data 135 is to align with data properties (e.g., production data properties 176) associated with the sample data 174. Thus, providing the sample data 174 allows the user 106 to define data properties of the test data 135 desired by the user 106. For example, when the user 106 desires to generate a million employee test records mimicking employee records in a production employee database table, the user 106 may provide sample data 174 (e.g., via a query 172) that includes 100 employee records from the production employee database table. Based on the sample data provided by the user 106, the data manager 150 may generate the requested million employee test records that adhere to the data properties of the sample employee records.

Once the sample data 174 has been extracted from the designated production database table 124 identified in the request 160, the data manager 150 may be configured to analyze the sample data 174 to determine statistical and structural properties (e.g., shown as production data properties 176) of the production data 125 included in the sample data 174. The production data properties 176 associated with the sample data 174 determined by the data manager 150 may include statistical and structural properties of the production data 125 included in the sample data 174 such as data distribution in the production database table 124, null distribution in the production database table 124, correlation among attributes of the production database table 124, identification and categorization of sensitive data in the production database table 124, outliers and anomalies in the production database table 124, correlations between columns (e.g., data attributes 126) of the production database table 124, formats of one or more fields in the production database table 124 that are to be replicated in test data 135, or a combination thereof. For example, when the production database table 124 is an employee table, the production data properties 176 extracted from the sample data 174 may include format of certain data types (e.g., data attributes 126/columns) such as a date format of employee joining date, format of employee ID, currency type of employee compensation etc. In one embodiment, based on the analysis of the sample data 174, the data manager 150 may be configured to generate an analysis report (not shown) that includes the production data properties 176 determined based on the sample data 174.

Once the table metadata 128 associated with the production database table 124 has been extracted (e.g., from the metadata catalog) and the production data properties 176 of the production data 135 has been determined based on the sample data 174, data manager 150 may be configured to generate the requested number 162 of records of the test data 135 based at least on the table metadata 128 and the production data properties 176. In one embodiment, data manager 150 may be configured to generate a generator object 182 based on the table metadata 128 and the production data properties 176. The generator object 182 is a software program configured to generate the requested test data 135 that is in conformance with the table metadata 128 and the production data properties 176 of the production database table 124. In other words, the generator object 182 is configured to generate test data 125 that mimics (e.g., resembles) the production data 125 from the production database table 124 identified in the request 160. Once the generator object 182 has been generated, the data manager 150 may be configured to run the generator object 182 to generate the requested number 162 of records of the test data 135.

In one or more embodiments, the data manager may be configured to use a machine learning (ML) model 187 (e.g., an Artificial Intelligence (AI) model) to generate the generator object 182. In this context, the ML model 187 may be trained to generate a generator object 182 based on table metadata 128 associated with a particular production database table 124 and production data properties 176 associated with production data 125 in the production database table 124. The data manager 150 may be configured to input into the ML model 187, the table metadata 128 associated with the production database table 124 and the production data properties 176 of the production data 135. The data manager 150 may obtain the generator object 182 as an output of the ML model 187.

In certain embodiments, once the requested number 162 of records of the test data 135 has been generated, data manager 150 may be configured to load the test data 135 into the test database table 134 identified as part of the target ID 166. As described above, the test database table 134 corresponds to the production database table 124 identified as part of the source ID 164, meaning that the structure of the test database table 134 is same as or similar to the production database table 124. For example, the test database table 134 includes the same data attributes 136 (e.g., datatypes/columns) as the corresponding data attributes 126 of the production database table 124.

In certain embodiments, once the requested number 162 of records of the test data 135 have been generated (e.g., by running the generator object 182), data manager 150 may be configured to validate the generated test data 135. Validating the test data 135 may include checking a quality of the generated test data 135. To validate the quality of the test data 135, the data manager 150 may be configured to determine a degree of conformance of the test data 135 to the table metadata 128 associated with the production database table 124 and/or the production data properties 176 associated with the production database table 124. For example, the data manager 150 determines to what extent the generated test data 135 satisfies the table metadata 128 associated with the production database table 124 and/or the production data properties 176 associated with the production database table 124. In one embodiment, the data manager 150 may be configured to generate a quality score 184 based on the result of the validation. For example, the data manager 150 may be configured to assign a higher quality score to the test data 135 in response to determining a higher degree of conformance to the table metadata 128 and/or the production data properties 176 as compared to a lower quality score 184 for a lower degree of conformance. For example, the data manager 150 may be configured to assign a higher quality score 184 in response to determining that a larger portion of the test data 135 conforms or satisfies the table metadata 128 and/or the production data properties 176.

In certain embodiments, the data manager may be configured to load the test data 135 into the test database table 134 only when the quality score 184 assigned to the test data 135 as a result of analyzing the quality of the test data 135 equals or exceeds a threshold score 186. This allows loading of the test data 135 into the test database table 134 only when the quality of test data 135 satisfies a minimum threshold which is represented by quality score 184≥threshold score 184.

Additionally, or alternatively, when the quality score 184 assigned to the test data 135 as part of the validation process described above is lower than the threshold score 184, data manager 150 may be configured to identify a portion of the test data 135 that does not satisfy the table metadata 128 and/or one or more production data properties 176. For example, the date format of one or more data fields relating to employee date of joining may not conform with the date format specified in a production data property 176. Once the portion of the test data 135 is identified, the data manager 150 may be configured to adjust the portion of the test data 135 to bring the portion in conformance with the table metadata 128 and/or one or more production data properties 176. For example, the data manager 150 may change the date format of the one or more data fields relating to employee date of joining to the date format specified by the respective production data property. Once the portion of the test data 135 is adjusted, the data manager 150 re-determines the quality score 184 of the test data 135 including the adjusted portion and loads the test data 135 into the test database table 134 when the quality score 184 equals or exceeds the threshold score 184.

In additional or alternative embodiments, before loading the test data 135 into the test database table 134, the data manager 150 may be configured to validate the test data 135 against data records 137 already stored in the test database table 134. Validating the test data 135 against data records

137 already stored in the test database table 134 may include comparing the data properties of the test data 135 with the respective data properties of the data records 137 already stored in the test database table 134. The data properties that are compared between the test data 135 and the data records 137 already stored in the test database table 134 are similar to the production data properties 176 described above that are associated with the production data 125. For example, similar to the production data properties 176, the data properties compared between the test data 135 and the data records 137 already stored in the test database table 134 include statistical and structural properties of the compared data. In response to determining a mismatch between one or more data properties between the test data 135 and the data records 137 already stored in the test database table 134, the data manager 150 may be configured to adjust the test data 135 or a portion thereof to bring the test data 135 or the portion thereof in conformance with the one or more data properties associated with the data records 137 already stored in the test database table 134. For example, when a date range of data values associated with employee date of joining in the test data 135 does not match with the corresponding date range of date of joining in the data records 137 already stored in the test database table 134, the data manager 150 may be configured to adjust the date range of the data values relating to date of joining to conform with those already stored in the test database table 134. For example, the data manager 150 may delete those data records 137 from the test data 135 that are out of the date range associated with data values in the data records 137 already stored in the test database table 134. In one embodiment, when a mismatch is found between data properties associated with the test data 135 and the data records 137 already stored in the test database table 134, data manager 150 may be configured to load the test data 135 into the test database table 134 only after adjusting the test data 135 so that there is little or no mismatch between the data properties of the test data 135 and the data records 137 already stored in the test database table 134.

In one or more embodiments, the data manager 150 may be configured to leverage previously generated generator objects 182 for generated requested test data 135. For example, data manager 150 may be configured to store (e.g., in memory 156) the generator object 182 for future use. When a subsequent request 160 requests generation of test data 135 with similar data properties (e.g., production data properties 176), the data manager 150 may be configured to access the stored generator object 182 that previously generated test data 135 with same or similar data properties. The data manager 150 then generates a requested number of records of test data 135 based on the stored generator object 182. This saves processing resources that would otherwise be used to generate the generator object 182 again. Further, using a previously generated generator object 182 reduces turnaround time associated with generating test data 135.

Synthetic Test Data Generation Using a Ruleset

In certain embodiments, the data manager 150 may be configured to generate test data 135 for the test system 130 based at least in part upon a set of rules 178 included the request 160 for generation of the test data 135. In one example, the request 160 to generate the test data 135 may include a number 162 of records of the test data 135 that are to be generated, a source ID 164 including an identity of the production system 120 and the identity of a particular production database table 124, a target ID 166 including an identity of the test system 130 and an identity of the test database table 134 in which the test data 135 is to be loaded, source credentials 168 associated with the production system 120, target credentials 170 associated with the target system 130, and a set of rules 178 defining data properties (shown as test data properties 180) the generated test data 135 is to satisfy.

The inclusion of the source ID associated with the production database table 124 indicates that the requested test data 135 is to at least partially mimic the production data 135 from the production database table 124. In one embodiment, the test database table 134 identified in the request 160 is configured to mimic the production database table 124 identified in the request 160. In other words, the data attributes 136 included in the test database table 134 are same or similar to the data attributes 126 included in the production database table 124.

The set of rules 178 defines test data properties 180 the generated test data 135 is to satisfy. For example, the test data properties 180 that are to be associated with the test data 135 includes characteristics of the test data 135 such as format of certain data attributes 136, data values that are to be taken by certain data attributes 136, correlations between data attributes 136, or any other characteristic associated with the test data 135. For example, when the test data 135 is to be generated for an employee test database table that corresponds to an employee production database table, test data properties 180 defined as part of the set of rules 178 may specify that the serial numbers of the data records 137 start from 1000, the joining dates associated with the employee records are in a certain date range of date of joining, employee designation is choses from a specified list of employee designations and the like.

In an alternative or additional embodiment, the request 160 may include a query 172 configured to extract a portion of the production data 125 from the particular production database table 124. As described further below, in addition to using the set of rules 178, the portion of the production data 125 extracted from the production database table 124 may be used as sample data 174 for generating the requested test data 135.

Upon receiving the request 160, the data manager 150 may be configured to obtain the table metadata 128 associated with the production database table 124 identified in the request 160. As described above, the table metadata 128 includes information about the production data 125 stored in the production database table 124, such as origin, format, quality, and usage of the production data 125. For example, table metadata 128 associated with a production database table 124 may include structured information that provides additional details about production data 125 such as data attributes 126 (e.g., columns) included in the production database table 124, data types, field names, and relationships. In one embodiment, the data manager 150 may be configured to extract table metadata 128 of the production database table 124 from the metadata catalog (not shown) associated with the production database 122.

In an additional or alternative embodiment, in cases where the request 160 includes the query 172, the data manager 150 runs the query 172 in the production database 122 to extract a portion of the production data 125 from the production database table 124 identified in the request 160. As described above, the query 172 is configured to extract the portion of the production data 125 from the particular production database table 124 for use as sample data 174. Once the sample data 174 has been extracted from the designated production database table 124 identified in the request 160, the data manager 150 may be configured to analyze the sample data 174 to determine the production data properties 176 associated with the sample data 174.

In some embodiments, once the table metadata 128 associated with the production database table 124 has been extracted (e.g., from the metadata catalog), data manager 150 may be configured to generate the requested number 162 of records of the test data 135 based at least on the table metadata 128 and the set of rules 178 included in the request 160. In one embodiment, data manager 150 may be configured to generate a generator object 182 based on the table metadata 128 and the set of rules 178. The generator object 182 is a software program configured to generate the requested test data 135 that is in conformance with the table metadata 128 and the set of rules 178. Once the generator object 182 has been generated, the data manager 150 may be configured to run the generator object 182 to generate the requested number 162 of records of the test data 135.

In additional or alternative embodiments, in cases where a query 172 is included in the request 160, data manager 150 be configured to additionally use at least a portion of the production data properties 176 determined based on the sample data 174. For example, the set of rules 178 may not comprehensively define all test data properties 180 needed to generate the test data 135. In such cases, the data manager 150 may select a portion of the production data properties 176 for which corresponding test data properties 180 do not exist in the set of rules 178. In this case, the data manager 150 may be configured to generate a generator object 182 based on the table metadata 128, the set of rules 178 included in the request 160, and the selected portion of the production data properties 176. Alternatively, the data manager 150 may be configured to generate the generator object 182 based on the table metadata 128, the set of rules 178 included in the request 160, and the entire production data properties 176 determined based on the sample data 174. In this case, while generating the generator object 182, the data manager 150 gives preference to the test data properties 180 in the set of rules 178 when a conflict is detected between certain test data properties 180 included in the set of rules 178 and corresponding production data properties 176.

In one or more embodiments, the data manager may be configured to use a machine learning (ML) model 187 (e.g., an Artificial Intelligence (AI) model) to generate the generator object 182. In this context, the ML model 187 may be trained to generate a generator object 182 based on table metadata 128 associated with a particular production database table 124 and the set of rules 178 included in the request 160. In an additional or alternative embodiment, the ML model 187 may be trained to generate a generator object 182 based on table metadata 128 associated with a particular production database table 124, the set of rules 178 and the production data properties 176 or a selected portion thereof associated with production data 125. The data manager 150 may be configured to input into the ML model 187, the table metadata 128 associated with the production database table 124, the set of rules 178, and, if needed, the production data properties 176 or a selected portion thereof. The data manager 150 may obtain the generator object 182 as an output of the ML model 187.

In certain embodiments, once the requested number 162 of records of the test data 135 has been generated, data manager 150 may be configured to load the test data 135 into the test database table 134 identified as part of the target ID 166. As described above, the test database table 134 corresponds to the production database table 124 identified as part of the source ID 164, meaning that the structure of the test database table 134 is same as or similar to the production database table 124. For example, the test database table 134 includes the same data attributes 136 (e.g., datatypes/columns) as the corresponding data attributes 126 of the production database table 124.

In certain embodiments, the once the requested number 162 of records of the test data 135 have been generated (e.g., by running the generator object 182), data manager may be configured to validate the generated test data 135. Validating the test data 135 may include checking a quality of the generated test data 135. To validate the quality of the test data 135, the data manager 150 may be configured to determine a degree of conformance of the test data 135 to the table metadata 128 associated with the production database table 124, the set of rules 178 and/or the production data properties 176 associated with the production database table 124 (e.g., when production data properties are additionally used to generate the generator object 182). For example, the data manager 150 determines to what extent the generated test data 135 satisfies the table metadata 128 associated with the production database table 124 and the set of rules 178. In one embodiment, the data manager 150 may be configured to generate a quality score 184 based on the result of the validation. For example, the data manager 150 may be configured to assign a higher quality score to the test data 135 in response to determining a higher degree of conformance to the table metadata 128 and/or the set of rules 178 as compared to a lower quality score 184 for a lower degree of conformance. For example, the data manager 150 may be configured to assign a higher quality score 184 in response to determining that a larger portion of the test data 135 conforms or satisfies the table metadata 128 and/or the set of rules 178. In another example, when production data properties 176 or a portion thereof is used in addition to the set of rules 178 to generate the generator object 182, the data manager 150 determines the quality score 184 based on conformance of the test data 135 to the table metadata 128, the set of rules 178, as well as the production data properties 176 or the portion thereof.

In certain embodiments, the data manager 150 may be configured to load the test data 135 into the test database table 134 only when the quality score 184 assigned to the test data 135 as a result of analyzing the quality of the test data 135 equals or exceeds a threshold score 186. This allows loading of the test data 135 into the test database table 134 only when the quality of test data 135 satisfies a minimum threshold which is represented by quality score 184≥threshold score 184.

Additionally, or alternatively, when the quality score 184 assigned to the test data 135 as part of the validation process described above is lower than the threshold score 184, data manager 150 may be configured to identify a portion of the test data 135 that does not satisfy the table metadata 128 and/or table metadata 128, the set of rules 178, and/or the production data properties 176. For example, the date format of one or more data fields relating to employee date of joining may not conform with the date format specified by a test data property 180 included in the set of rules 178. Once the portion of the test data 135 is identified, the data manager 150 may be configured to adjust the portion of the test data 135 to bring the portion in conformance with the table metadata 128, set of rules 178, and/or one or more production data properties 176. For example, the data manager 150 may change the date format of the one or more data fields relating to employee date of joining to the date format specified by the respective test data property 180. Once the portion of the test data 135 is adjusted, the data manager 150 re-determines the quality score 184 of the test data 135 including the adjusted portion and loads the test data 135 into the test database table 134 when the quality score 184 equals or exceeds the threshold score 184.

Figure 2:
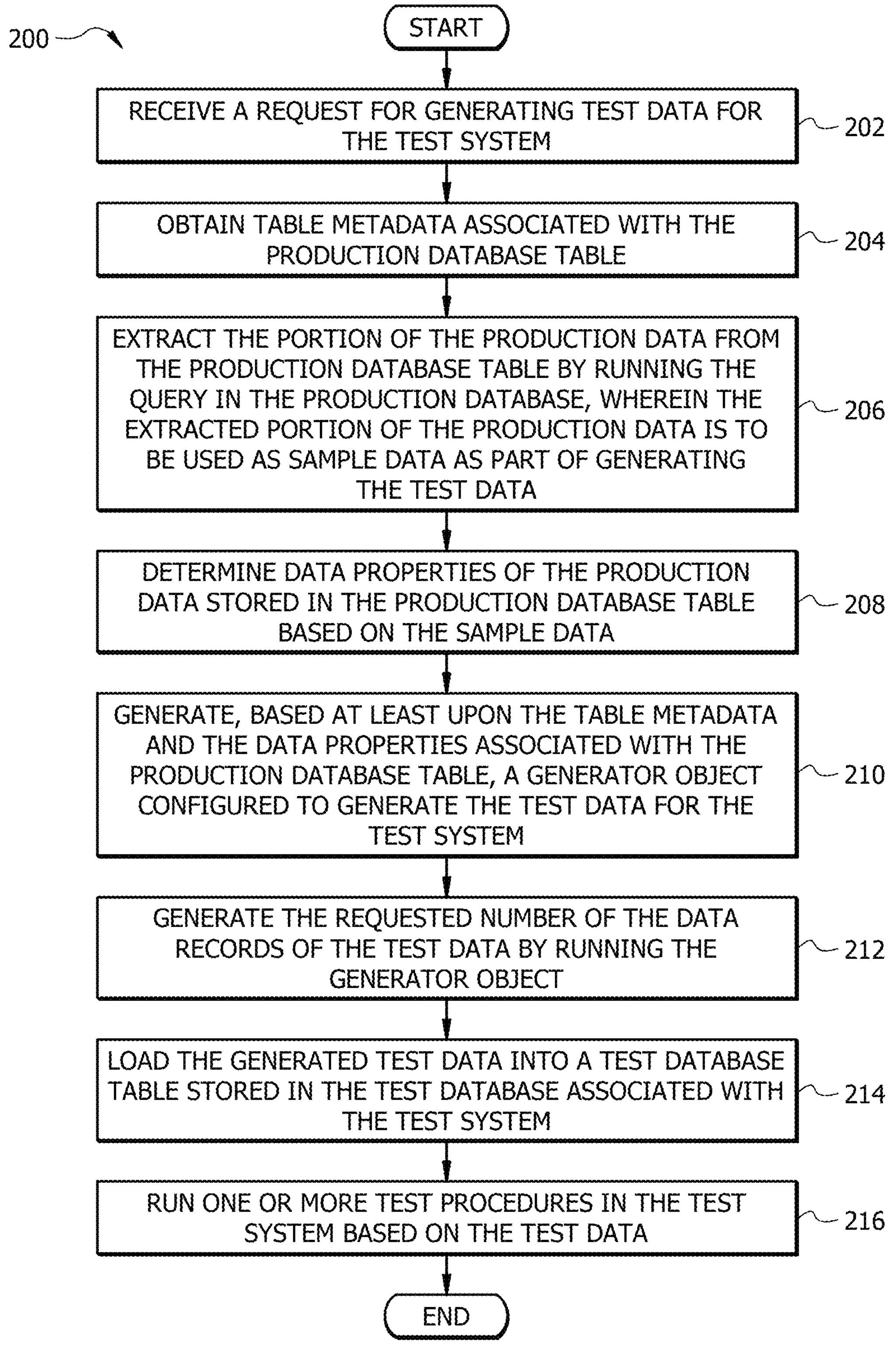
FIG. 2 illustrates a flowchart of an example method for generating test data, in accordance with one or more embodiments of the present disclosure.

FIG. 2 illustrates a flowchart of an example method 200 for generating test data 135, in accordance with one or more embodiments of the present disclosure. Method 200 may be performed by the data manager 150 shown in FIG. 1.

At operation 202, the data manager 150 receives a request 160 for generating test data 135 for a test system 130, wherein the test data 135 is to at least partially mimic production data 125 from a production database table 124 that is stored in a production database 122 associated with a production system 120. The request 160 at least includes a number 162 of data records (e.g., data records 137) of the test data 135 that are to be generated and a query 172 configured to extract a portion of the production data 125 from the production database table 124.

As described above, the data manager 150 may be configured to generate test data 135 for the test system 130, wherein the test data 135 at least partially mimics the production data 125 in the production system 120. The process of generating test data 135 may begin with the data manager 150 receiving a request 160 for generating test data 135 for the test system 130 that at least partially mimics production data 125 associated with the production system. The request 160 may be initiated by a user 106 (e.g., using a computing node 104). Additionally, or alternatively, the request 160 may be generated by one or more computing nodes 104 without intervention from a user 106.

The request 160 to generate the test data 135 may include a number 162 of records of the test data 135 that are to be generated, a source ID 164 including an identity of the production system 120 and the identity of a particular production database table 124, a target ID 166 including an identity of the test system 130 and an identity of the test database table 134 in which the test data 135 is to be loaded, source credentials 168 associated with the production system 120, target credentials 170 associated with the target system 130, and a query 172 configured to extract a portion of the production data 125 from the particular production database table 124. As described further below, the portion of the production data 125 extracted from the production database table 124 is used as sample data 174 for generating the requested test data 135. The inclusion of the source ID associated with the production database table 124 indicates that the requested test data 135 is to at least partially mimic the production data 135 from the production database table 124. In one embodiment, the test database table 134 identified in the request 160 is configured to mimic the production database table 124 identified in the request 160. In other words, the data attributes 136 included in the test database table 134 are same or similar to the data attributes 126 included in the production database table 124.

At operation 204, data manager 150 obtains table metadata 128 associated with the production database table 124, wherein the table metadata 128 at least includes a format of the production database table 124.

As described above, upon receiving the request 160, the data manager 150 may be configured to obtain the table metadata 128 associated with the production database table 124 identified in the request 160. As described above, the table metadata 128 includes information about the production data 125 stored in the production database table 124, such as origin, format, quality, and usage of the production data 125. For example, table metadata 128 associated with a production database table 124 may include structured information that provides additional details about production data 125 such as data attributes 126 (e.g., columns) included in the production database table 124, data types, field names, and relationships. In one embodiment, the data manager 150 may be configured to extract table metadata 128 of the production database table 124 from the metadata catalog (not shown) associated with the production database 122.

At operation 206, data manager 150 extracts the portion of the production data 125 from the production database table 124 by running the query 172 in the production database 122, wherein the extracted portion of the production data 125 is to be used as sample data 174 as part of generating the test data 135.

As described above, the data manager 150 runs the query 172 in the production database 122 to extract a portion of the production data 125 from the production database table 124 identified in the request 160. As described above, the query 172 is configured to extract the portion of the production data 125 from the particular production database table 124. As described further below, the portion of the production data 125 extracted from the production database table 124 is to be used as sample data 174 for generating the requested test data 135. For example, a user 106 who initiated the request 160 may configure the query 172 as a means to provide sample data 174, wherein the generated test data 135 is to align with data properties (e.g., production data properties 176) associated with the sample data 174. Thus, providing the sample data 174 allows the user 106 to define data properties of the test data 135 desired by the user 106. For example, when the user 106 desires to generate a million employee test records mimicking employee records in a production employee database table, the user 106 may provide sample data 174 (e.g., via a query 172) that includes 100 employee records from the production employee database table. Based on the sample data provided by the user 106, the data manager 150 may generate the requested million employee test records that adhere to the data properties of the sample employee records.

At operation 208, data manager 150 determines data properties (e.g., production data properties 176) of the production data 125 stored in the production database table 124 based on the sample data 174 extracted from the production database table 124.

As described above, once the sample data 174 has been extracted from the designated production database table 124 identified in the request 160, the data manager 150 may be configured to analyze the sample data 174 to determine statistical and structural properties (e.g., shown as production data properties 176) of the production data 125 included in the sample data 174. The production data properties 176 associated with the sample data 174 determined by the data manager 150 may include statistical and structural properties of the production data 125 included in the sample data 174 such as data distribution in the production database table 124, null distribution in the production database table 124, correlation among attributes of the production database table 124, identification and categorization of sensitive data in the production database table 124, outliers and anomalies in the production database table 124, correlations between columns (e.g., data attributes 126) of the production database table 124, formats of one or more fields in the production database table 124 that are to be replicated in test data 135, or a combination thereof. For example, when the production database table 124 is an employee table, the production data properties 176 extracted from the sample data 174 may include format of certain data types (e.g., data attributes 126/columns) such as a date format of employee joining date, format of employee ID, currency type of employee compensation etc. In one embodiment, based on the analysis of the sample data 174, the data manager 150 may be configured to generate an analysis report (not shown) that includes the production data properties 176 determined based on the sample data 174.

At operation 210, data manager 150 generates, based at least upon the table metadata 128 and the data properties (e.g., production data properties 176) associated with the production database table 124, a generator object 182 configured to generate the test data 135 for the test system 130, wherein the generator object 182 is a software program configured to generate the test data 135 mimicking the production data 125 from the production database table 124.

As described above, once the table metadata 128 associated with the production database table 124 has been extracted (e.g., from the metadata catalog) and the production data properties 176 of the production data 135 has been determined based on the sample data 174, data manager 150 may be configured to generate the requested number 162 of records of the test data 135 based at least on the table metadata 128 and the production data properties 176. In one embodiment, data manager 150 may be configured to generate a generator object 182 based on the table metadata 128 and the production data properties 176. The generator object 182 is a software program configured to generate the requested test data 135 that is in conformance with the table metadata 128 and the production data properties 176 of the production database table 124. In other words, the generator object 182 is configured to generate test data 125 that mimics (e.g., resembles) the production data 125 from the production database table 124 identified in the request 160. Once the generator object 182 has been generated, the data manager 150 may be configured to run the generator object 182 to generate the requested number 162 of records of the test data 135.

At operation 212, data manager 150 generates the requested number 162 of the data records 137 of the test data 135 by running the generator object 182.

At operation 214, data manager 150 loads the generated test data 135 into a test database table 134 stored in the test database 132 associated with the test system 130.

As described above, once the requested number 162 of records of the test data 135 has been generated, data manager 150 may be configured to load the test data 135 into the test database table 134 identified as part of the target ID 166. As described above, the test database table 134 corresponds to the production database table 124 identified as part of the source ID 164, meaning that the structure of the test database table 134 is same as or similar to the production database table 124. For example, the test database table 134 includes the same data attributes 136 (e.g., datatypes/columns) as the corresponding data attributes 126 of the production database table 124.

At operation 216, data manager 150 runs one or more test procedures in the test system 130 based on the test data 135.

Figure 3:
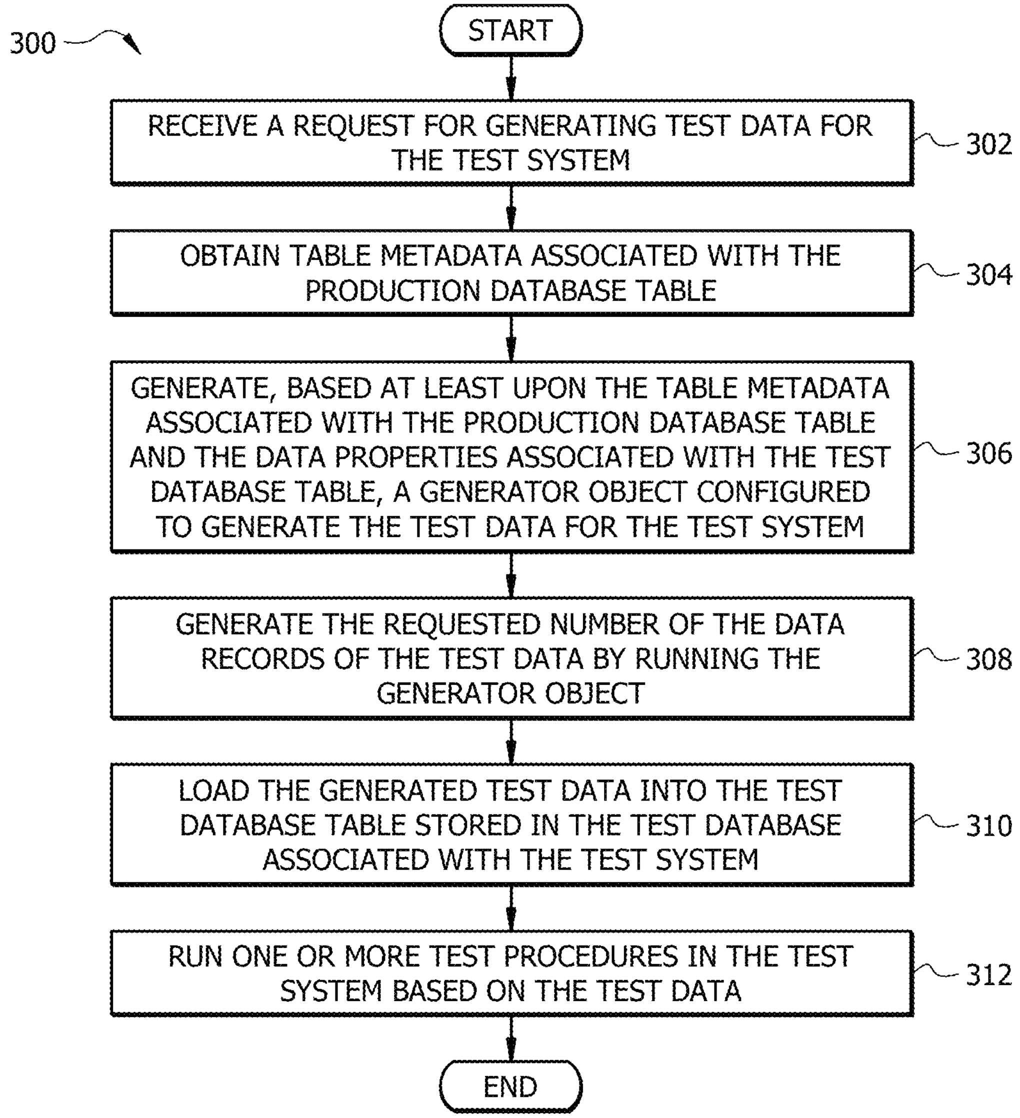
FIG. 3 illustrates a flowchart of an example method for generating test data 135, in accordance with one or more embodiments of the present disclosure.

FIG. 3 illustrates a flowchart of an example method 300 for generating test data 135, in accordance with one or more embodiments of the present disclosure. Method 200 may be performed by the data manager 150 shown in FIG. 1.

At operation 302, the data manager 150 receives a request 160 for generating test data 135 for a test system 130, wherein the test data 135 is to at least partially mimic production data 125 from a production database table 124 that is stored in a production database 122 associated with a production system 120. The request 160 at least includes a number 162 of data records (e.g., data records 137) of the test data 135 that are to be generated and a set of rules 178 at least defining data properties for one or more data attributes 136 associated with a test database table 134 that is to mimic the production database table 124, wherein the test database table 134 is stored in the test database 132 associated with the test system 130. A data property defined for a particular data attribute 136 at least defines one or more data values that can be assigned to data fields associated with the particular data attribute 136 in the test database table 134.

As described above, the data manager 150 may be configured to generate test data 135 for the test system 130 based at least in part upon a set of rules 178 included the request 160 for generation of the test data 135. In one example, the request 160 to generate the test data 135 may include a number 162 of records of the test data 135 that are to be generated, a source ID 164 including an identity of the production system 120 and the identity of a particular production database table 124, a target ID 166 including an identity of the test system 130 and an identity of the test database table 134 in which the test data 135 is to be loaded, source credentials 168 associated with the production system 120, target credentials 170 associated with the target system 130, and a set of rules 178 defining data properties (shown as test data properties 180) the generated test data 135 is to satisfy.

The inclusion of the source ID associated with the production database table 124 indicates that the requested test data 135 is to at least partially mimic the production data 135 from the production database table 124. In one embodiment, the test database table 134 identified in the request 160 is configured to mimic the production database table 124 identified in the request 160. In other words, the data attributes 136 included in the test database table 134 are same or similar to the data attributes 126 included in the production database table 124.

The set of rules 178 defines test data properties 180 the generated test data 135 is to satisfy. For example, the test data properties 180 that are to be associated with the test data 135 includes characteristics of the test data 135 such as format of certain data attributes 136, data values that are to be taken by certain data attributes 136, correlations between data attributes 136, or any other characteristic associated with the test data 135. For example, when the test data 135 is to be generated for an employee test database table that corresponds to an employee production database table, test data properties 180 defined as part of the set of rules 178 may specify that the serial numbers of the data records 137 start from 1000, the joining dates associated with the employee records are in a certain date range of date of joining, employee designation is choses from a specified list of employee designations and the like.

At operation 304, the data manager 150 obtains table metadata 128 associated with the production database table 124, wherein the table metadata 128 at least includes a format of the production database table 124.

As described above, upon receiving the request 160, the data manager 150 may be configured to obtain the table metadata 128 associated with the production database table 124 identified in the request 160. As described above, the table metadata 128 includes information about the production data 125 stored in the production database table 124, such as origin, format, quality, and usage of the production data 125. For example, table metadata 128 associated with a production database table 124 may include structured information that provides additional details about production data 125 such as data attributes 126 (e.g., columns)

included in the production database table 124, data types, field names, and relationships. In one embodiment, the data manager 150 may be configured to extract table metadata 128 of the production database table 124 from the metadata catalog (not shown) associated with the production database 122.

At operation 306, the data manager 150 generates, based at least upon the table metadata 128 associated with the production database table 124 and the data properties associated with the test database table 134, a generator object 182 configured to generate the test data 135 for the test system 130, wherein the generator object 182 is a software program configured to generate the test data 135 in accordance with the table properties associated with the production database table 124 and the data properties associated with the test database table 134 as defined by the set of rules 178.

As described above, once the table metadata 128 associated with the production database table 124 has been extracted (e.g., from the metadata catalog), data manager 150 may be configured to generate the requested number 162 of records of the test data 135 based at least on the table metadata 128 and the set of rules 178 included in the request 160. In one embodiment, data manager 150 may be configured to generate a generator object 182 based on the table metadata 128 and the set of rules 178. The generator object 182 is a software program configured to generate the requested test data 135 that is in conformance with the table metadata 128 and the set of rules 178. Once the generator object 182 has been generated, the data manager 150 may be configured to run the generator object 182 to generate the requested number 162 of records of the test data 135.

At operation 308, the data manager 150 generates the requested number 162 of the data records 137 of the test data 135 by running the generator object 182.

At operation 310, the data manager 150 loads the generated test data 135 into the test database table 134 stored in the test database 132 associated with the test system 130.

As described above, once the requested number 162 of records of the test data 135 has been generated, data manager 150 may be configured to load the test data 135 into the test database table 134 identified as part of the target ID 166. As described above, the test database table 134 corresponds to the production database table 124 identified as part of the source ID 164, meaning that the structure of the test database table 134 is same as or similar to the production database table 124. For example, the test database table 134 includes the same data attributes 136 (e.g., datatypes/columns) as the corresponding data attributes 126 of the production database table 124.

At operation 312, the data manager 150 runs one or more test procedures in the test system 130 based on the test data 135.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

a memory configured to at least store credentials for accessing a production database associated with a production system and a test database associated with a test system; and a processor communicatively coupled to the memory and configured to:

receive a request for generating test data for the test system, wherein:

the test data is to at least partially mimic production data from a production database table that is stored in the production database associated with a production system; and the request at least comprises a number of data records of the test data that are to be generated and a query configured to extract a portion of the production data from the production database table;

obtain table metadata associated with the production database table, wherein the table metadata at least comprises a format of the production database table;

extract the portion of the production data from the production database table by running the query in the production database, wherein the extracted portion of the production data is to be used as sample data as part of generating the test data;

determine data properties of the production data stored in the production database table based on the sample data extracted from the production database table;

generate, based at least upon the table metadata and the data properties associated with the production database table, a generator object configured to generate the test data for the test system, wherein the generator object is a software program configured to generate the test data mimicking the production data from the production database table;

generate the requested number of the data records of the test data by running the generator object;

load the generated test data into a test database table stored in the test database associated with the test system; and run one or more test procedures in the test system based on the generated test data.

2. The system of claim 1, wherein the request comprises one or more of:

an identity of the production database;

a first credential to access the production database;

an identity of the test database; or a second credential to access the test database.

3. The system of claim 1, wherein:
the data properties of the production data determined based on the sample data comprises one or more of data distribution in the production database table, null distribution in the production database table, correlation among attributes of the production database table, identification and categorization of sensitive data in the production database table, outliers and anomalies in the production database table, correlations between columns of the production database table, or formats of one or more fields in the production database table that are to be replicated in test data.

4. The system of claim 1, wherein the processor is further configured to:
validate the generated test data based on the data properties of the production data determined based on the sample data, wherein the validating comprises checking whether the generated test data satisfies the data properties of the production data; and
determine a quality score for the generated test data based on the validating, wherein a higher quality score is assigned to the generated test data when a larger portion of the generated test data satisfies the data properties of the production data.

5. The system of claim 4, wherein the processor is further configured to:
load the generated test data into the test database table when the quality score assigned to the generated test data equals or exceeds a threshold score.

6. The system of claim 4, wherein the processor is further configured to:
determine based on the validating that a portion of the generated test data does not satisfy one or more data properties associated with the production data; and
in response to determining that the portion of the generated test data does not satisfy one or more data properties associated with the production data, adjust the portion of the generated test data to align with the one or more data properties associated with the production data.

7. The system of claim 1, wherein the processor is further configured to:
input the table metadata and the data properties associated with the production database table into a machine learning (ML) model, wherein the ML model is trained to generate generator objects for the test system; and
obtain the generator object as an output of the ML model.

8. A method for generating test data for a test system, the method comprising:
receiving a request for generating test data for the test system, wherein:
the test data is to at least partially mimic production data from a production database table that is stored in a production database associated with a production system; and
the request at least comprises a number of data records of the test data that are to be generated and a query configured to extract a portion of the production data from the production database table;
obtaining table metadata associated with the production database table, wherein the table metadata at least comprises a format of the production database table;
extracting the portion of the production data from the production database table by running the query in the production database, wherein the extracted portion of the production data is to be used as sample data as part of generating the test data;
determining data properties of the production data stored in the production database table based on the sample data extracted from the production database table;
generating, based at least upon the table metadata and the data properties associated with the production database table, a generator object configured to generate the test data for the test system, wherein the generator object is a software program configured to generate the test data mimicking the production data from the production database table;
generating the requested number of the data records of the test data by running the generator object;
loading the generated test data into a test database table stored in the test database associated with the test system; and
running one or more test procedures in the test system based on the generated test data.

9. The method of claim 8, wherein the request comprises one or more of:
an identity of the production database;
a first credential to access the production database;
an identity of the test database; or
a second credential to access the test database.

10. The method of claim 8, wherein:
the data properties of the production data determined based on the sample data comprises one or more of data distribution in the production database table, null distribution in the production database table, correlation among attributes of the production database table, identification and categorization of sensitive data in the production database table, outliers and anomalies in the production database table, correlations between columns of the production database table, or formats of one or more fields in the production database table that are to be replicated in test data.

11. The method of claim 8, further comprising:
validating the generated test data based on the data properties of the production data determined based on the sample data, wherein the validating comprises checking whether the generated test data satisfies the data properties of the production data; and
determining a quality score for the generated test data based on the validating, wherein a higher quality score is assigned to the generated test data when a larger portion of the generated test data satisfies the data properties of the production data.

12. The method of claim 11, further comprising:
loading the generated test data into the test database table when the quality score assigned to the generated test data equals or exceeds a threshold score.

13. The method of claim 11, further comprising:
determining based on the validating that a portion of the generated test data does not satisfy one or more data properties associated with the production data; and
in response to determining that the portion of the generated test data does not satisfy one or more data properties associated with the production data, adjusting the portion of the generated test data to align with the one or more data properties associated with the production data.

14. The method of claim 8, further comprising:
inputting the table metadata and the data properties associated with the production database table into a machine learning (ML) model, wherein the ML model is trained to generate generator objects for the test system; and obtaining the generator object as an output of the ML model.

15. A non-transitory computer-readable medium storing instructions that when executed by a processor cause the processor to:

receive a request for generating test data for a test system, wherein:

the test data is to at least partially mimic production data from a production database table that is stored in a production database associated with a production system; and the request at least comprises a number of data records of the test data that are to be generated and a query configured to extract a portion of the production data from the production database table;

obtain table metadata associated with the production database table, wherein the table metadata at least comprises a format of the production database table;

extract the portion of the production data from the production database table by running the query in the production database, wherein the extracted portion of the production data is to be used as sample data as part of generating the test data;

determine data properties of the production data stored in the production database table based on the sample data extracted from the production database table;

generate, based at least upon the table metadata and the data properties associated with the production database table, a generator object configured to generate the test data for the test system, wherein the generator object is a software program configured to generate the test data mimicking the production data from the production database table;

generate the requested number of the data records of the test data by running the generator object;

load the generated test data into a test database table stored in the test database associated with the test system; and run one or more test procedures in the test system based on the generated test data.

16. The non-transitory computer-readable medium of claim 15, wherein the request comprises one or more of:

an identity of the production database;

a first credential to access the production database;

an identity of the test database; or a second credential to access the test database.

17. The non-transitory computer-readable medium of claim 15, wherein:

the data properties of the production data determined based on the sample data comprises one or more of data distribution in the production database table, null distribution in the production database table, correlation among attributes of the production database table, identification and categorization of sensitive data in the production database table, outliers and anomalies in the production database table, correlations between columns of the production database table, or formats of one or more fields in the production database table that are to be replicated in test data.

18. The non-transitory computer-readable medium of claim 15, wherein the instructions further cause the processor to:

validate the generated test data based on the data properties of the production data determined based on the sample data, wherein the validating comprises checking whether the generated test data satisfies the data properties of the production data; and determine a quality score for the generated test data based on the validating, wherein a higher quality score is assigned to the generated test data when a larger portion of the generated test data satisfies the data properties of the production data.

19. The non-transitory computer-readable medium of claim 18, wherein the instructions further cause the processor to:

load the generated test data into the test database table when the quality score assigned to the generated test data equals or exceeds a threshold score.

20. The non-transitory computer-readable medium of claim 18, wherein the instructions further cause the processor to:

determine based on the validating that a portion of the generated test data does not satisfy one or more data properties associated with the production data; and in response to determining that the portion of the generated test data does not satisfy one or more data properties associated with the production data, adjust the portion of the generated test data to align with the one or more data properties associated with the production data.

* * * * *